Aug. 23, 1932.   F. C. FISHER   1,872,920
ADJUSTABLE FULCRUM SUPPORT FOR WEIGHING SCALES
Filed June 12, 1931
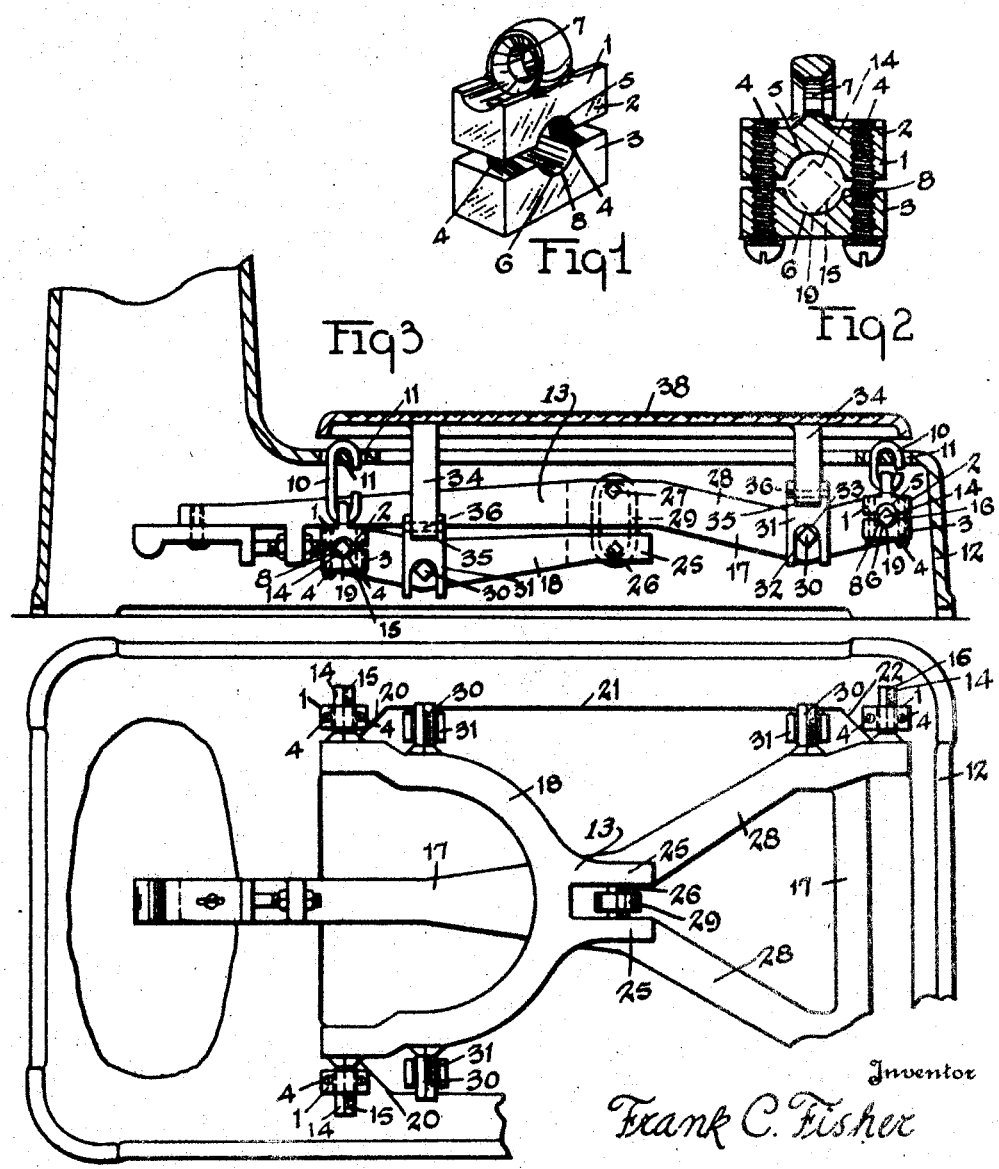

UNITED STATES PATENT OFFICE

FRANK C. FISHER, OF TOLEDO, OHIO

ADJUSTABLE FULCRUM SUPPORT FOR WEIGHING SCALES

Application filed June 12, 1931. Serial No. 543,935.

My invention has for its object to provide a supporting means for the actuated parts of weighing machines which also provides for variable adjustment of the parts to maintain them in an accurate balance relation relative to the rest of the operating parts. The invention provides a block having a fulcrum supporting surface which is so supported that it may be adjusted and yet maintain the relationship of the surface to the fulcrum point, thereby enabling minute adjustment of the fulcrum points relative to each of the other points and vertically with respect to a horizontal plane, and without varying the sensitiveness of the weighing machine. By providing this adjustable feature for such types of supporting means, the invention also makes provision for maintaining the contact point of each supporting block constant with respect to the distances between the related fulcrum points. This advantage prevents binding or drawing of the members and inaccurate cooperation with other parts of the machine during its operation.

The invention consists in other features and advantages which will appear from the following description and upon examination of the drawing. Structures containing the invention may partake of different forms and may be varied in their details and still embody the invention. To illustrate a practical application of the invention, I have selected a supporting member embodying the invention as an example of the various structures, and the details of such structures, that contain the invention, and shall describe the selected structure hereinafter, it being understood that variations may be made and that certain features of my invention may be used to advantage without a corresponding use of other features, and without departing from the spirit of the invention. The particular structure selected is shown in the accompanying drawing.

Fig. 1 is a perspective view of the supporting member. Fig. 2 is a view of longitudinal section taken through the member. Fig. 3 is a sectional view of the base of a weighing machine wherein the supporting members may be used. Fig. 4 is an inverted bottom view of the base of the machine and the operating mechanism located therein.

It is well known that the actuated elements of a weighing machine are pivotally supported at four corners in the base of the machine. The supporting members are usually suspended in the base by links and when the members are not properly located relative to each other, the actuated elements are thrown out of balance. To adjust the scale the links are then bent to vary their length and thus maintain the supporting members in their proper relation to the coactuating members. This method of correcting errors has been found faulty since minute adjustments cannot be accurately determined or made by the bending of metal links to either shorten or lengthen them. The contact point of the fulcrum on the surface of the link is moved with respect to the other fulcrum contact points upon changing the configuration of the link. This change of configuration is caused by the change in length of the link and cannot be avoided and the inclination of the surface that supports the fulcrum is also changed which alters the responsiveness of the weighing mechanism.

In the form of construction illustrated in the drawing, I have provided support members 1 for supporting the actuating members of the weighing machine. The support members are formed of two parts 2 and 3 that are connected relative to each other by a pair of bolts 4 that are located in the ends of the parts. The parts have semi-circular grooves extending transversely across their surfaces, the groove 5 being formed in the bottom surface of the part 2 and the groove 6 in the upper or top surface of the part 3. The grooves 5 and 6 form a central opening 8 through the member 1 when the parts 2 and 3 are connected by the bolts 4. The part 2 may also be provided on its top surface with a lug having a central opening or eye 7. Link members 10 extend through the eyes 7 of the support members 1 and through the slots 11 formed in the base 12 of the machine to suspend the blocks 1 therein.

In order to support the actuated elements by the members 1 within the base 12 of the machine, the actuated elements are provided with the pins 14 which may be formed as a part of, or secured in, the ends of the actuated elements such as the parts 17 and 18. The parts 17 and 18 form the compound lever 13 of the weighing mechanism. The pins 14 are rectangular in shape and their surfaces are inclined to the vertical so that when the pins are located in the supporting members 1, the lower corners 19 of the pins 14 will rest on the surface of the groove 6 in the part 3 of the members and thus provide exceedingly delicate pivotal points for both of the lever parts 17 and 18.

The lever part 17 of the compound lever 13 extends longitudinally through the base 12 of the machine and may be connected to other parts of the weighing device (not shown). The lever part 17 is connected to the part 18 at a point which is substantially centrally located between the supporting members 1. The lever part 18 is semi-circular in form and the pins 15 of the supporting pins 14 are connected to the part 18 so as to extend into the openings 8 of the supporting members 1 which are located in the corners 20 of the rectangular opening 21 formed in the base of the machine. The part 18 is also provided with a pair of lugs 25 which are formed on the outer surface of the arm at a point that is midway between the ends of the semi-circular part of the arm and a rectangular pin 26 is secured in the lugs 25. The lever part 17 is formed in the shape of a Y and a pin 27 is located at the point of junction of the legs 28. The pins 16, which support the lever part 17, are located in the ends of the legs 28 and the members 1, supporting the lever part 17, are located in the corners 22 of the opening 21. The pins 26 and 27 are connected together by a metal loop or band 29. The lower corner of the pin 26 engages the surface of the lower curve of the band 29 and the upper corner of the pin 27 engages the surface of the upper curve of the band 29 to interconnect the lever parts 17 and 18, thereby forming the compound lever 13 and also providing for pivotal movement of the lever parts as they are moved angularly relative to each other.

The compound lever 13 is also provided with rectangular pins 30 which are located at equally spaced points between the pin 27 and the pins 16 on the lever part 17 and between pin 26 and pins 14 on the part 18. The pins 30 support saddle blocks 31 which are pivotally connected to the platform of the weighing machine. The lower ends of the blocks 31 are provided with channels 32 which have semi-circular ends 33 so that, in the operation of the device, the engagement of the corners of the pins 30 on the surface of the ends 33 will allow free movement of the interconnected parts and also balance the platform.

The platform 38 is provided with four downwardly extending lugs 34. The lugs 34 are connected to the saddle blocks 31 which are provided at their upper ends with channels 35. The lugs extend into the channels 35 and are pivotally connected to the blocks 31 by pins 36. Thus, the platform 38 is supported at one end on the lever part 17 and on the lever part 18 at the other. The lever parts, being pivotally supported at their outer ends and interconnected by the pins 26 and 27 and the band 29, will transmit equally any pressure exerted on the platform to the rest of the weighing machine.

In order to maintain the fulcrum points of the compound lever in a properly balanced relationship, the part 3 of the members 1 may be raised or lowered relative to the part 2 by the rotation to bolts 4. However, since the part 3 of the member 1 is only moved vertically to adjust the location of the fulcrum point, the parallel relation between the pairs of pins 14 and 16, which support the compound lever 13, is not changed. Thus, any slight variation in the location of the fulcrum points may be made to provide correct operating of the weighing mechanism and assure proper balance during continuous application of pressure.

I claim:

1. In a weighing machine, the machine having a hollow base, a plurality of members, links connected to the base for supporting the members within the base, each of the said members being formed of two parts, the parts being connected by bolts and having semi-circular grooves formed in their adjacent edge surfaces, the said edges being placed together to form transversely extending openings through the members, interconnected actuating members located in the base, the actuating elements having square pins located in their end portions, the pins extending into the openings of the said first mentioned members to support the actuating elements in the base of a machine and means for moving the said parts of the said supporting members relative to each other to vary the location of the contact points of the pins of the actuated elements relative to each other.

2. In a weighing machine, the machine having a base, a plurality of members located within the base, links for supporting the said members from the base, semi-circular grooves formed in the upper edge surface of the members, actuating elements forming the compound lever of the weighing machine, wedge shaped pins located in the ends of the lever, the lever being pivotally supported by the wedge shaped pins on the surface of the said grooves of the members and means for adjustably moving the said members to change the locations of the points of pivotal contact of the said pins of the said compound lever and for maintaining a constant relation between the wedge shaped pins and the semi-circular grooves.

3. In a weighing machine, the machine having a hollow base, the plurality of members located within the base, each of the members being formed of two parts, the parts having semi-circular grooves formed in their adjacent edge surfaces, the said edges forming openings when the parts of the members are placed together, links for supporting the members in the base of the machine, actuating elements located between the said members, the elements being interconnected to form a compound lever, pins located on the sides of the compound lever and extending into the openings formed in the members, the planes of the surfaces of the pins being located at an angle to the vertical, the lower corners of the pins engaging the lower surfaces of the openings formed in the supporting members, and means for adjusting the location of the fulcrum points of the said pins relative to each other.

In witness whereof I have hereunto signed my name to this specification.

FRANK C. FISHER.